(12) United States Patent
Flemming et al.

(10) Patent No.: US 11,885,751 B2
(45) Date of Patent: Jan. 30, 2024

(54) TESTING DEVICE AND TESTING METHOD

(71) Applicants: Carl Zeiss Vision International GmbH, Aalen (DE); Carl Zeiss Jena GmbH, Jena (DE)

(72) Inventors: Marc Flemming, Jena (DE); Hannes Scheibe, Jena (DE); Dominik Wiedemann, Aalen (DE); Alexander Friedl, Aalen (DE); Daniel Schoebel, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/468,867

(22) Filed: Sep. 18, 2023

(65) Prior Publication Data
US 2024/0003829 A1 Jan. 4, 2024

Related U.S. Application Data

(63) Continuation of application No. PCT/EP2023/053464, filed on Feb. 13, 2023.

(30) Foreign Application Priority Data

Feb. 16, 2022 (EP) .................... 22157064

(51) Int. Cl.
*G01N 21/00* (2006.01)
*G01N 21/958* (2006.01)
*G01N 21/88* (2006.01)

(52) U.S. Cl.
CPC ... *G01N 21/958* (2013.01); *G01N 2021/8835* (2013.01); *G01N 2021/9583* (2013.01)

(58) Field of Classification Search
CPC ......... G01M 11/0264; G01M 11/0278; G01M 11/0285; G06T 7/60; G06T 7/001;
(Continued)

(56) References Cited

U.S. PATENT DOCUMENTS 4,460,273 A 7/1984 Koizumi et al.
4,647,197 A * 3/1987 Kitaya ................. G01B 11/303
348/133
(Continued)

FOREIGN PATENT DOCUMENTS

CN 105067639 B 3/2018
DE 3237511 A1 4/1984
(Continued)

OTHER PUBLICATIONS

Industrial Norm "Ophthalmic optics—Spectacle lenses—Vocabulary (ISO 13666:2019)," English version EN ISO ISO 13666:2019, Dec. 2019.
(Continued)

*Primary Examiner* — Hoa Q Pham
(74) *Attorney, Agent, or Firm* — Tautz & Schuhmacher LLC; Georg M. Hasselmann

(57) ABSTRACT

A testing device for detecting defects of transparent test specimens, in particular of ophthalmological lenses, has an illumination device for transilluminating test specimens to be examined and with an image acquisition device for imaging the test specimen transilluminated by the illumination device. The illumination device includes a plurality of linearly adjustable light sources for generating a stripe pattern. To capture the stripe pattern, the acquisition duration of the image acquisition device can be adjusted in such a way that the light emitted by each of the light sources is detected as a light stripe. Further, the disclosure relates to a testing method for detecting a defect of a transparent specimen.

19 Claims, 4 Drawing Sheets

(58) Field of Classification Search
CPC ... G06T 7/0004; G06T 7/0008; G06T 7/0085; G06T 2207/30164; G06T 2207/10016; G06T 2207/10144; G02C 7/04; H04N 5/2256; H04N 5/247; H04N 5/332; H04N 5/372; G01N 21/896; G02B 27/141
USPC .... 356/124–127, 237.1–237.5, 239.1–239.8; 382/141, 143, 144, 100
See application file for complete search history.

(56) References Cited

U.S. PATENT DOCUMENTS

| | | | |
|---|---|---|---|
| 4,822,165 A | | 4/1989 | Schmallfuss et al. |
| 5,004,909 A | * | 4/1991 | Fukuchi ............... G01N 21/90 |
| | | | 356/239.5 |
| 5,289,254 A | | 2/1994 | Braunecker et al. |
| 8,081,840 B2 | | 12/2011 | Laurent |
| 2008/0198602 A1 | | 8/2008 | Brittain et al. |

FOREIGN PATENT DOCUMENTS

| | | |
|---|---|---|
| EP | 1248092 A2 | 10/2002 |
| EP | 2325625 A1 | 5/2011 |
| EP | 1016860 B1 | 7/2016 |
| JP | 3736080 B2 | 1/2006 |
| JP | 2006267022 A | 10/2006 |
| WO | 2019243568 A1 | 12/2019 |

OTHER PUBLICATIONS

European Search Report issued in EP 22 157 064, to which this application claims priority, dated Jul. 29, 2022.
European Search Opinion issued in EP 22 157 064, to which this application claims priority, dated Jul. 29, 2022.
International Search Report issued in PCT/EP2023/053464, to which this application claims priority, dated May 3, 2023.
Written Opinion issued in PCT/EP2023/053464, to which this application claims priority, dated May 3, 2023.

* cited by examiner

TESTING DEVICE AND TESTING METHOD

CROSS REFERENCE TO RELATED APPLICATIONS

This application is a continuation application of International patent application PCT/EP2023/053464, filed on Feb. 13, 2023 and designating the U.S., which claims priority to European patent application EP 22 157 064.1, filed on Feb. 16, 2022, both of which are hereby incorporated by reference in their entireties.

TECHNICAL FIELD

The disclosure relates to a testing device for detecting defects of transparent test specimens, in particular of ophthalmological lenses, with an illumination device for transilluminating test specimens to be examined and with an image acquisition device for imaging the test specimen transilluminated by the illumination device. The disclosure further relates to a testing method for detecting a defect of a transparent specimen, in particular of an ophthalmological lens; comprising:
  (a) an image acquisition step in which a plurality of stripe recordings is captured by an image acquisition device and are generated with the aid of an illumination device;
  (b) a reconstruction step, in which an overall image is reconstructed from the stripe recordings; and
  (c) a defect detection step in which a possible defect is detected from the overall image.

BACKGROUND

In the production of transparent test specimens, especially those that have an optical effect, such as ophthalmic lenses like spectacle lenses, quality control is often very time-consuming and is carried out visually in the absence of automated processes that would be suitable for detecting defects safely and reliably. This manual or visual inspection of the test specimens is carried out by trained employees who have to check each test specimen individually for the presence of defects during production. Typical defects that appear on and/or in the test specimens can be divided into three different classes according to their visual effect. These are light-absorbing defects, light-refracting defects and light-diffracting defects. In addition, however, the defects contained in the test specimens can also belong to several of the aforementioned classes.

The problem associated with manual or visual testing is that the result of such testing is subjective and can be influenced by various factors. For example, the quality and thus the result of the quality control strongly depends on the daily form of the test person, his or her state of mind, the time of the check or other factors. In addition, the examination is very tiring for the employee due to the monotony of the task, so that the result is often not reproducible. In addition, it has proven to be disadvantageous that the result of the review varies from employee to employee, making it difficult to achieve uniform results. In order to further homogenize the results of the review, a not inconsiderable amount of training is therefore necessary, the results of which have to be verified within the framework of measurement system analyses. In addition, a very long period of several months is often required to train the inspecting staff, which means that an expansion of production capacities at short notice is not possible.

In the context of the disclosure, a transparent test specimen is understood to mean in particular a test specimen made of a material that can be used for the production of optical components, i.e. in particular a test specimen made of an optical material according to DIN EN ISO 13666:2019-12, section 3.3.1. In particular, in the context of the disclosure, a transparent test specimen can be a blank according to DIN EN ISO 13666:2019-12, section 3.8.1, i.e. a piece of an optical material with an optically finished surface for the manufacture of an ophthalmic lens, or it can also be a finished ophthalmic lens according to DIN EN ISO 13666:2019-12, section 3.8.7, i.e. an ophthalmic lens with two optically finished surfaces, in which the edge processing has already been carried out or still has to be carried out. Furthermore, the transparent test specimens can also be other blanks or pressed parts or also precision-ground parts.

In the context of this disclosure the terms "linear adjustment" and "linear movement" are used interchangeably.

Therefore, there have been efforts for some time to automate the inspection for defects in such test specimen in order to ensure reproducible defect detection.

A comparable testing device is also known from U.S. Pat. No. 8,081,840 B2, in which stripe patterns are shown by means of a display, which also serves as an illumination device, and which shine through the transparent test specimen, which is arranged between the illumination device and the camera, and are recorded by the camera. In the U.S. Pat. No. 8,081,840 B2 the content depicted on the display is controlled in order to change the position of the stripes between the individual images.

EP 1 016 860 B1 describes an inspection device in which only the outer edge of contact lenses is inspected for defects. In EP 1 016 860 B1, the other areas of the contact lenses to be examined are shaded for this purpose, so that the light from the light source only penetrates the contact lens in the area of the outermost edge area and is guided from there to the camera.

A testing device for the examination of contact lenses is known from EP 1 248 092 A2, in which two images are recorded with different illumination situations. These images are then evaluated in a downstream step in order to be able to draw conclusions about any defects present in or on the contact lenses.

A testing device and a testing method according to the type mentioned at the beginning is already known from WO 2019/243568 A1, which is considered to be the closest prior art. Here, a display is used as the illumination device, on which geometric patterns with different brightness values, more precisely stripe patterns with alternating bright or white and dark stripes, are shown, which are then detected by means of a camera, wherein the transparent test specimen is arranged between the display serving as the illumination device and the camera. In other words, the display transilluminates the test specimen, and the camera captures a corresponding image of the transilluminated test specimen. The position of the light and dark stripes on the monitor is then changed between the individual images. The captured stripe recording—or stripe images—can then be combined in a recombination step to form an overall image and evaluated for defect detection, as described in detail in WO 2019/243568 A1, for example. However, WO 2019/243568 A1 has shown that it is disadvantageous that the individual pixels of the display are also imaged by the camera, which has a negative influence on the automatic detection of defects and thus has a disadvantageous effect on the inspection result.

SUMMARY

It is therefore an object of the present disclosure to reduce the aforementioned disadvantages and to provide an improved testing device and an improved testing method for defect control.

This objective relating to the testing device is achieved according to the disclosure with a testing device for detecting defects of transparent test specimens with an illumination device. The objective relating to the improved testing method for defect control is achieved according to the disclosure with a testing method including generating a plurality of stripes with an illumination device and capturing the generated plurality of stripes with an image acquisition device.

According to a first aspect of the testing device for detecting defects of transparent test specimens, in particular of ophthalmological lenses, the testing device comprises an illumination device for transilluminating test specimens to be examined and an image acquisition device for imaging the test specimen transilluminated by the illumination device. The illumination device comprises a plurality of light sources, which are linearly moveable by a first drive in a first direction for generating a stripe pattern. In order to capture the stripe pattern, the acquisition duration of the image acquisition device can be adjusted in such a way that the light emitted by each of the light sources, moved linearly by the first drive in the first directions, is detected as a light stripe.

In other words, the light sources are moved linearly in a common direction while the image of the test specimen illuminated by the light sources is captured by the image acquisition device. The acquisition duration of the image acquisition device is adapted to the velocity of the linear adjustment of the light sources in such a way that the light sources are not captured or imaged by the image acquisition device as individual points, but rather as light stripes, whereby adjacent light stripes are each separated by a dark strip. Since each light stripe is ultimately generated by a single light source, it is simultaneously ensured that when the stripe patterns are generated, the stripes each have a homogeneous and for test specimen with a rather flat curvature— at a constant speed, especially within the light stripe—a consistently bright light distribution, which improves the detection of defects of the test specimen. However, depending on the curvature of the test specimen the light stripes might not exhibit a consistently bright light distribution. The light sources are typically point light sources, for example LEDs. Especially LEDs with a small luminous area have been proven to be specifically preferable. The test specimen is positioned between the illumination device and the image acquisition device so that the transparent test specimen is transilluminated by the illumination device from one side—for example, from the rear surface— and the other side—for example, the front surface—is captured by the image acquisition device. In case of an ophthalmic lens the front surface of the test specimen is according to DIN EN ISO 13666:2019-12, section 3.2.13, the surface of the lens intended to be fitted away from the eye which, when used as intended, and the back surface is according to DIN EN ISO 13666:2019-12, section 3.2.14, the surface of the lens intended to be fitted nearer to the eye side.

According to a second aspect of the testing device for detecting defects of transparent test specimens, in particular of ophthalmological lenses, the testing device comprises an illumination device for transilluminating test specimens to be examined and an image acquisition device for imaging the test specimen transilluminated by the illumination device. The illumination device comprises a plurality of light sources, which are arranged on a light carrier which is linearly moveable in a first direction for generating a stripe pattern. In order to capture the stripe pattern, the acquisition duration of the image acquisition device can be adjusted in such a way that the light emitted by each of the light sources arranged on the light carrier and moved linearly in the first direction is detected as a light stripe.

In a third aspect of the disclosure, the testing device for detecting defects of transparent test specimens, in particular of ophthalmological lenses, comprises an illumination device for transilluminating test specimens to be examined and an image acquisition device for imaging the test specimen transilluminated by the illumination device. The illumination device comprises a plurality of point light sources, which are designed as LEDs and which are linearly moveable in a first direction for generating a stripe pattern. In order to capture the stripe pattern, the acquisition duration of the image acquisition device can be adjusted in such a way that the light emitted by each of the light sources moved linearly in the first direction is detected as a light stripe.

In this context, it has also proved to be particularly advantageous if a first drive is provided for linear adjustment, i.e. movement of the light sources in a first direction and/or in that a second drive is provided for linear adjustment of the light sources in a second direction substantially perpendicular to the first direction, which are in each case substantially perpendicular to an observation path of the image acquisition device. The first drive, which linearly adjusts, i.e. moves, the light sources in the first direction, serves to generate the stripe pattern. According to the disclosure, the second drive, which adjusts the light sources in the second direction, which is perpendicular to the first direction, serves to reposition the light sources between the individual stripe recordings. In the context of the disclosure a stripe recording means an image captured by the image acquisition device, which might be a camera, of the transilluminated test specimen while the light sources are linearly adjusted in the first direction. The first drive also ensures that the light sources of the illumination device can be adjusted as uniformly as possible in a linear manner, thereby ensuring that the light stripes are generated uniformly. In the context of the disclosure, however, it is also envisaged here that the change in the position of the light stripes in the second direction between two stripe recordings is affected by the fact that the distances between adjacent light sources are ultimately very small. During the capture of the individual stripe recordings, only a part of the light sources is then activated, while the remaining light sources remain deactivated. The linear adjustment of the light sources in the second direction between the stripe recordings, which can alternatively—as described above—be carried out by the second drive, is then solved by deactivating the previously activated—i.e. illuminating—light sources during the next stripe recording and activating one of the adjacent light sources in each case. In other words, only every $x^{th}$ light source is operated when creating the first stripe recording and the $x+1^{th}$ light source is operated when creating the second stripe recording. This has the advantage that there is no need for the second drive.

In order to ensure that the light sources can be adjusted evenly in the first direction and/or in the second direction, it has also proven advantageous if the light sources are arranged on a light carrier. In this case, it has also proven to be particularly favorable if the light carrier extends along the second direction. In addition, the light sources can be positioned on the light carrier in a particularly simple but at the same time precise manner. In an exemplary embodiment, the light carrier is formed as a cuboid whose longitudinal axis extends parallel to the second direction. Also, the light carrier can be designed as a one-dimensional grid, i.e., as a thin and narrow structure or cuboid.

In addition, it has also proven useful if the light sources are arranged at an equidistant distance from one another. As a result, the stripe recordings captured are as uniform as possible, which simplifies the downstream evaluation for defect detection. Furthermore, the equidistant distance between the light sources results in an equidistant distance also for the light stripes originating from the light sources. Hence, knowing the distance between the light stripes allows to linearly adjust the position of the light sources in the second direction in an appropriate manner between each stripe recording in order to ensure the covering of the whole test specimen with the different light stripes.

It has also proven advantageous if the distance D between adjacent light sources is greater than 3 mm, typically greater than 5 mm and further typically less than 12 mm, typically less than 10 mm and particularly typically 7 mm. If the distance between adjacent light sources is too small or too large, this has a negative effect on the testing device according to the disclosure and on the detection of the defects in the test specimen. For example, if the distance is too large, the number of required stripe recordings increases. If, on the other hand, the distance between adjacent light sources is too small, the dark stripes between two light stripes are over-illuminated and a separation of neighboring light stripes is no longer possible. Also, there might be a superposition of light from two different spatial directions, so that defects may no longer be visible. In addition, the number of light sources must be increased in a detrimental manner.

It has also been shown to be advantageous if the number of light sources is greater than 1, typically greater than 8 and particularly typically greater than 12 and further typically less than 50, typically less than 30 and most typically 23. In the case of test specimens exhibiting a strong optical effect, it has proven to be disadvantageous if too few light sources are used, as the outer edge areas of the test specimen cannot be illuminated due to an insufficient number of LEDs. Furthermore, more stripe recordings must be captured, which has a disadvantageous effect on the duration of the defect detection. If, on the other hand, the number of light sources is too high there the technical complexity increases.

In order to keep the acquisition period of the image acquisition device as short as possible, it has been shown to be advantageous if the velocity of the first drive for moving the light sources in the first direction and/or the velocity of the second drive for moving the light sources in the second direction is greater than 1,000 mm/s, typically greater than 2,000 mm/s, particularly typically greater than 2,500 mm/s and further typically less than 5,000 mm/s, typically less than 4,000 mm/s, particularly typically less than 3,500 mm/s and most typically 3,000 mm/s. However, as the velocity increases, so does the complexity of the equipment, so that a velocity of 3,000 mm/s has proved to be a very good compromise. It must also be noted here that it has proven sufficient for the adjustment of the light sources in the second direction if the velocity of the second drive is lower than the velocity of the first drive used for the linear adjustment of the light sources in the first direction. In particular, the linear displacement of the light sources in the second direction is significantly lower than the linear displacement in the first direction, so that a lower velocity in the linear displacement of the light sources in the second direction between the stripe recordings does not entail a significantly longer duration of the defect detection.

The same applies to acceleration: on the one hand, the highest possible acceleration values are aimed for in order to achieve the desired speed for linear movement of the light sources as quickly as possible. On the other hand, the higher the acceleration, the higher the technical effort required to achieve these high accelerations. It has therefore proven to be useful if the acceleration of the first and/or the acceleration of the second drive is greater than 10,000 mm/s$^2$, typically greater than 15,000 mm/s$^2$, particularly typically greater than 18,000 mm/s$^2$ and further typically less than 30,000 mm/s$^2$, typically less than 25,000 mm/s$^2$, particularly typically less than 22,000 mm/s$^2$ and most typically 20,000 mm/s$^2$. In particular, an acceleration of 20,000 mm/s$^2$ has proven to be a good compromise. At these high acceleration values, it is particularly ensured that the capture of the stripe recordings is not adversely affected by areas where the speed of the light sources in the first direction would be too low, causing the brightness to increase locally.

It has also proved advantageous if the image acquisition device comprises a camera with a telecentric lens. Using such a telecentric lens provides a limited acceptance angle to facilitate to visualize the differences in brightness caused by the defects, especially by weakly refractive defects. Furthermore, this ensures that the image captures are still accurate even if the test specimen should move out of focus. In addition, the depth of field is increased and even less distortion is achieved. In this context, it has also been shown to be advantageous if a collimator lens is arranged between the illumination device and the test specimen, whereby the light impinging on the test specimen is directed in a preferred way.

According to a first aspect of the of the testing method the method comprises (a) an image acquisition step in which a plurality of stripe recordings are captured by an image acquisition device and are generated with the aid of an illumination device; (b) a reconstruction step, in which an overall image is reconstructed from the stripe recordings; and (c) a defect detection step in which a possible defect is detected from the overall image. The illumination device for generating a stripe pattern comprises a plurality of light sources, which are linearly moved in a first direction by a first drive in the image acquisition step. In order to capture the stripe pattern the acquisition duration of the image acquisition device is set in such a way that the light emitted by the linearly moved light sources is respectively detected as a light stripe.

According to a second aspect of the of the testing method the method comprises (a) an image acquisition step in which a plurality of stripe recordings are captured by an image acquisition device and are generated with the aid of an illumination device; (b) a reconstruction step, in which an overall image is reconstructed from the stripe recordings; and (c) a defect detection step in which a possible defect is detected from the overall image. The illumination device for generating a stripe pattern comprises a plurality of light sources, arranged on a light carrier, which is linearly moved in a first direction in the image acquisition step. In order to capture the stripe pattern the acquisition duration of the image acquisition device is set in such a way that the light emitted by the linearly moved light sources is respectively detected as a light stripe.

According to a third aspect of the of the testing method the method comprises (a) an image acquisition step in which a plurality of stripe recordings are captured by an image acquisition device and are generated with the aid of an illumination device; (b) a reconstruction step, in which an overall image is reconstructed from the stripe recordings; and (c) a defect detection step in which a possible defect is detected from the overall image. The illumination device for generating a stripe pattern comprises a plurality of point light sources, which are designed as LEDs and which are linearly moved in a first direction in the image acquisition step. In order to capture the stripe pattern the acquisition duration of the image acquisition device is set in such a way that the light emitted by the linearly moved light sources is respectively detected as a light stripe.

While the reconstruction step and the defect detection step are already known, for example, from WO 2019/243568 A1, the present method differs from the present prior art precisely by the image acquisition step. According to the disclosure, the light sources are linearly adjusted in the image acquisition step, and the acquisition duration of the image acquisition device is adapted in such a way that the linear adjustment of the light sources can be detected as a stripe pattern.

Within the scope of the disclosure, it is also provided in this case that in the image acquisition step for displacing the stripe pattern between the individual stripe recordings, the light sources are displaced in a second direction oriented substantially perpendicular to the first direction.

However, it has also proved to be favorable if, in the image acquisition step, different light sources are used in each case for generating the stripe pattern in the individual stripe recordings. different light sources are used in the image acquisition step for displacing the stripe pattern to produce the stripe pattern. If the distance between the light sources is selected to be correspondingly small, it is possible to displace the stripe patterns without having to linearly adjust the light sources themselves for this purpose.

It has also proven advantageous if the position of the detected defects is recorded during or after the defect detection step. The position of the detected defects can be determined, for example, in relation to permanent engravings that are deliberately worked into the test specimen during the manufacturing process. By detecting the position of the defects on the test specimen and typically storing them in a database or storage, it is possible to decide how to proceed with the test specimen, in particular in a downstream evaluation step. Depending on the position of the defect, which can be stored in a database, a decision can be made as to whether the test specimen concerned must be discarded if, for example, the detected defect is located in the center of the test specimen or can be used only for certain production processes. However, if the defect is located in the peripheral area of the test specimen, it may be possible to cut it off during downstream processing, for example in the case of a spectacle lens, so that the test specimen does not have to be discarded, which results in a considerable cost saving. In this context, it is also envisaged to record the density of the defects. The type of defect can also be recorded and, if necessary, stored in a database or storage, so that it is possible to make the decision as to whether the test specimen should be discarded or not dependent on the type of defect, i.e. whether, for example, the defect can be rectified by post-processing.

BRIEF DESCRIPTION OF THE DRAWINGS

The disclosure will now be described with reference to the drawings wherein.

DETAILED DESCRIPTION OF EXEMPLARY EMBODIMENTS

Figure 1:
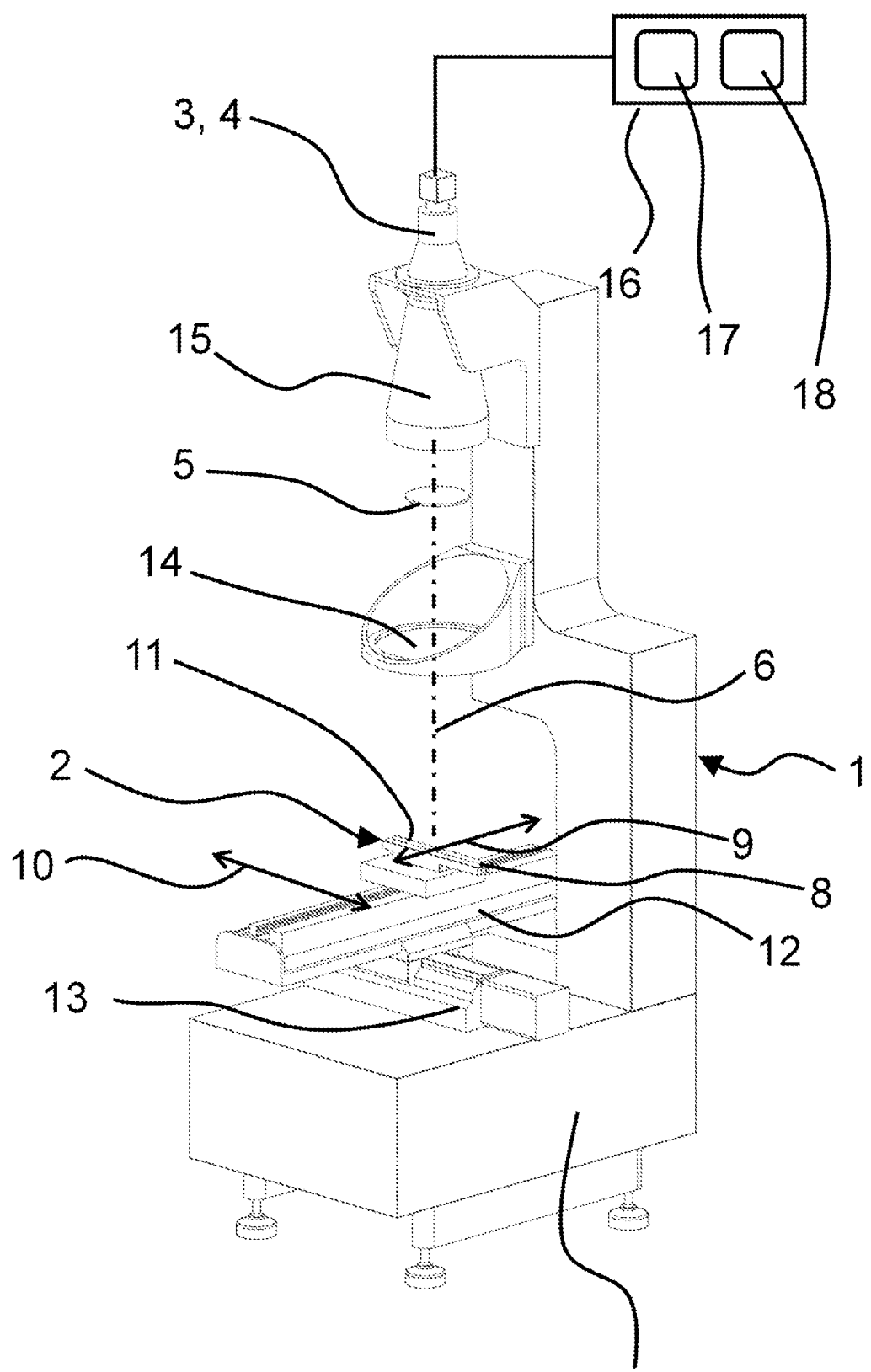
FIG. 1 shows a perspective view of a testing device.
Figure 2A:
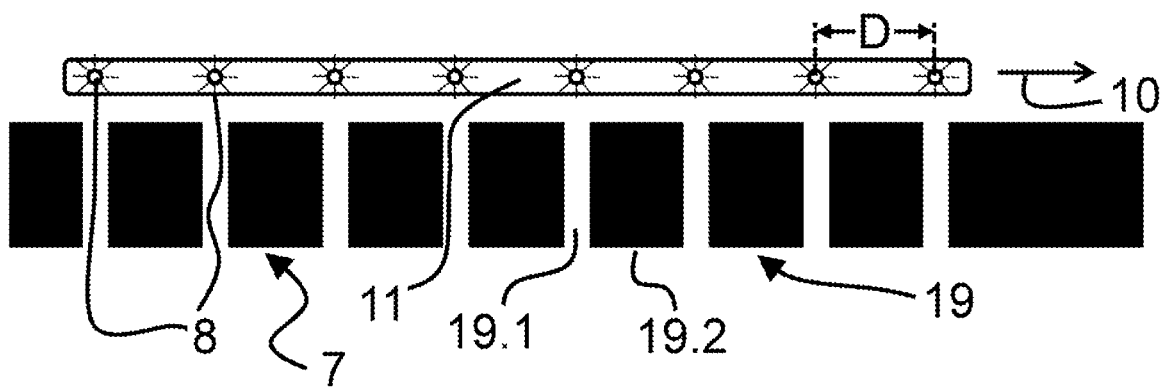
FIGS. 2A to 2E show a schematic view of a first exemplary embodiment of a light carrier and sections of corresponding stripe recordings.
Figure 2B:
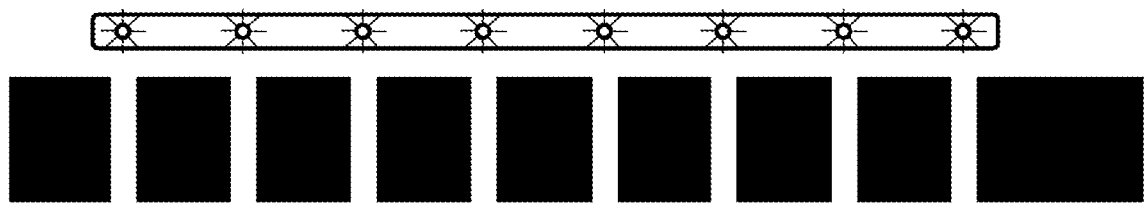
Figure 2C:
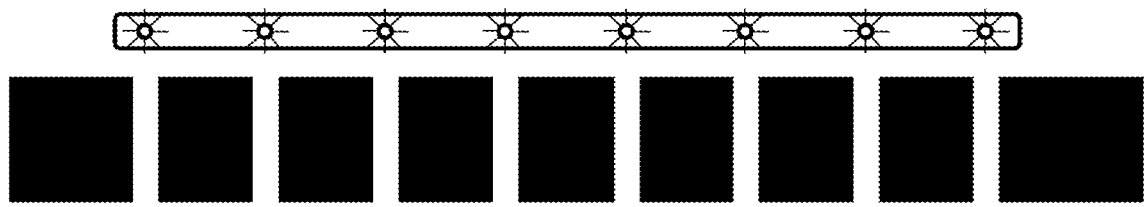
Figure 2D:
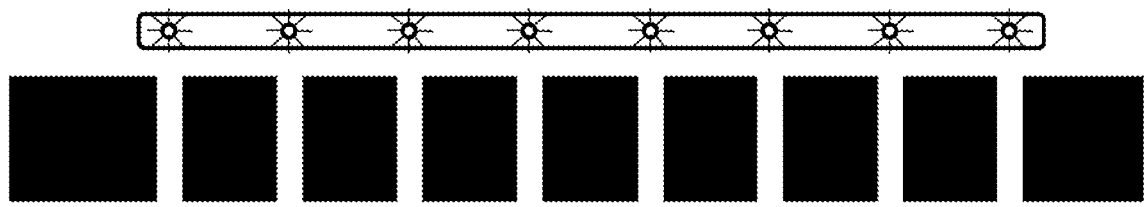
Figure 2E:
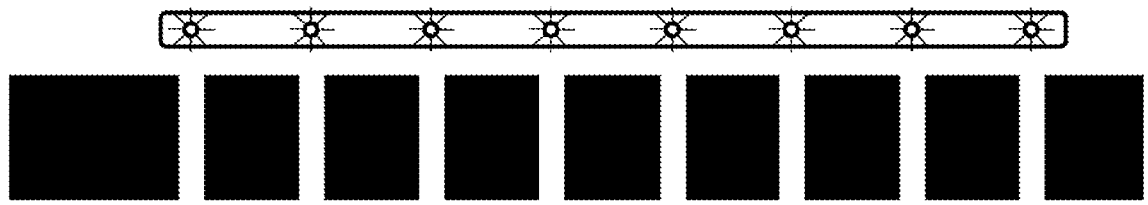
Figure 3A:
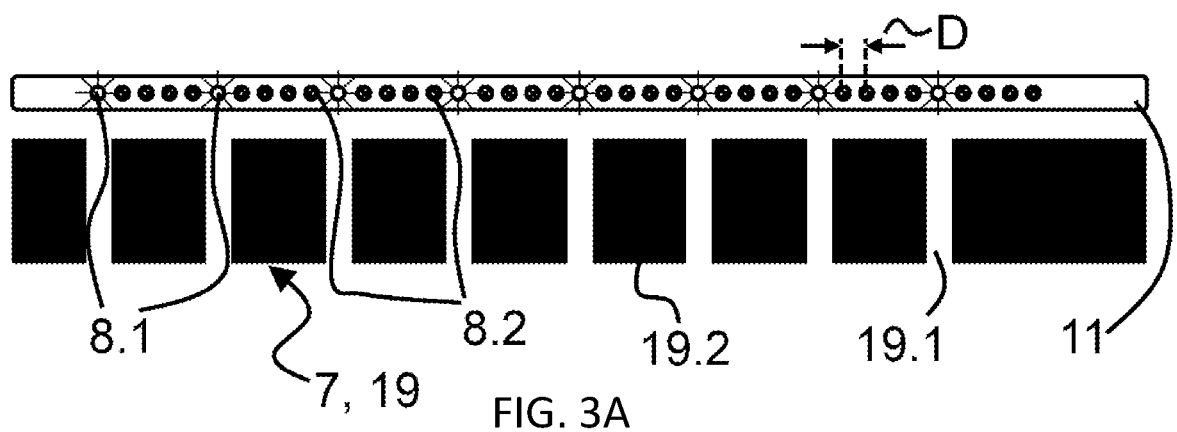
FIGS. 3A to 3E show a schematic view of a second exemplary embodiment of the light carrier and sections of corresponding stripe recordings.
Figure 3B:
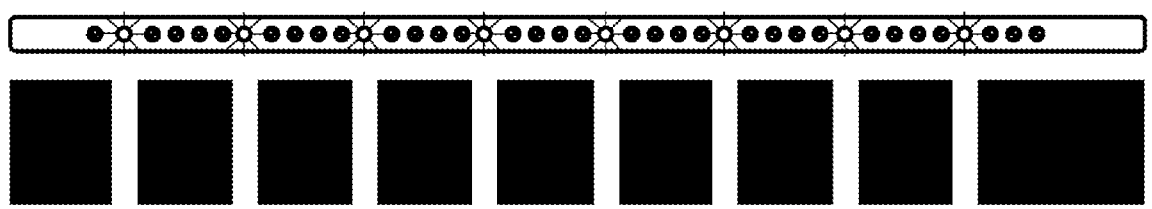
Figure 3C:
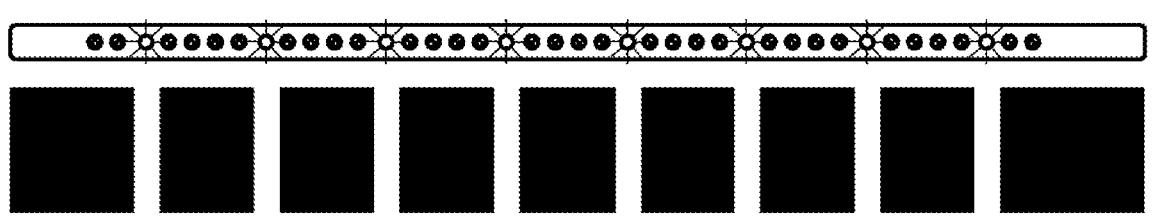
Figure 3D:
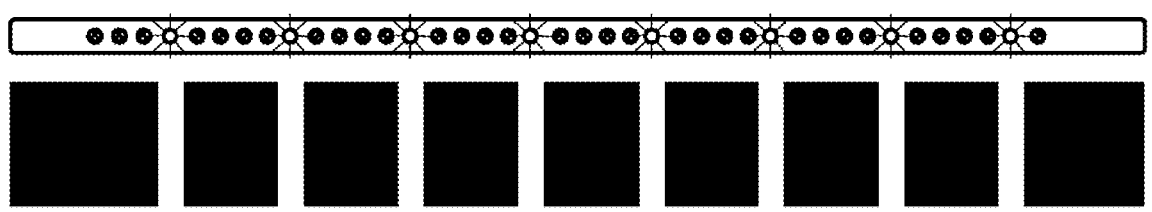
Figure 3E:
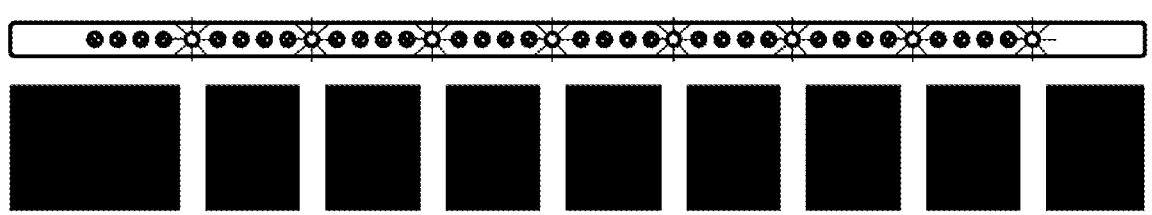

FIG. 1 shows a perspective view of a testing device 1 for detecting defects in a transparent test specimen 5, which in the present exemplary embodiment is formed by an ophthalmic lens. The testing device 1 comprises an illumination device 2 with which the test specimens 5 to be examined are transilluminated. The light penetrating the test specimen 5 is thereby detected by an image acquisition device 3, which in the present exemplary embodiment example is designed as a camera 4. In order to be able to transilluminate the test specimen 5, it is positioned in an observation path 6 of the image acquisition device 3 by means of a handling system, which is not displayed in FIG. 1 for reasons of clarity. In order to be able to detect any defects that may be present in the test specimen 5 and/or on a surface of the test specimen 5, the test specimen 5 is not illuminated over its entire surface, but with a stripe pattern 7. This stripe pattern 7 is achieved in the exemplary embodiment shown in FIG. 1 in that the illumination device 2 comprises a plurality of light sources 8, which are formed as LEDs that can be adjusted linearly in a first direction 9. For this purpose, the light sources 8, each of which has an equidistant distance D between them, are arranged on a light carrier 11 which can be moved linearly in the first direction 9 by means of a first drive 12, as indicated by the double arrow in FIG. 1. The light carrier 11 extends along a second direction 10, which is oriented essentially perpendicular to the first direction 9. If the image acquisition device 3, which in the example shown is designed as a camera 4, were to take a picture of the test object without the light carrier 11 being linearly adjusted in the first direction 9, only light points would be captured by the camera 4. Only adapting the acquisition duration of the image acquisition device 3—or the exposure duration of the camera 4—to the velocity of the linear adjustment of the light carrier 11 in the first direction 9 will ultimately result in a stripe recording 19. However, in order to be able to carry out the defect detection of the test specimen 5, further stripe recording 19 are required in which the stripes have a different positioning with regard to the second direction 10. In the exemplary embodiment shown in FIG. 1, this is achieved by providing a second drive 13 that linearly adjusts the light carrier 11 in the second direction 10, as indicated by the double arrow in FIG. 1. The adjustment of the light carrier 11 in the first direction 9 and/or in the second direction 10 explicitly includes the linear adjustment in both opposite directions, as indicated by the double arrow in the first direction 9 and in the second direction 10. This can be used to further reduce the time for capturing the required stripe recordings 19. Thus, when the individual stripe recordings 19 are captured, the light carrier 11 can be adjusted alternately in the first direction 9 and in the opposite direction linearly. In other words, the light carrier 11 can be adjusted in the first direction 9 for detecting a first stripe recording 19 and in the opposite direction for detecting a second stripe recording 19. The first direction 9 and the second direction 10 are both perpendicular to each other and also to the observation path 6.

As described above, the light sources 8 between adjacent light sources 8 all have an equidistant distance D from each other, which is usually greater than 3 mm, typically greater than 5 mm and further typically less than 12 mm, typically less than 10 mm and is—in the present exemplary embodiment—7 mm. According to the disclosure, the number of light sources 8 is greater than 1, typically greater than 8 and more typically greater than 12 and further typically less than 50, typically less than 30 and most typically 23. Hence, in the present exemplary embodiment displayed in FIG. 1 in total 23 light sources 8 are used. The velocity of the first drive 12 is greater than 1,000 mm/s, typically greater than 2,000 mm/s, more typically greater than 2,500 mm/s and further typically less than 5,000 mm/s, typically less than 4,000 mm/s, more typically less than 3,500 mm/s and is—in the displayed exemplary embodiment –3,000 mm/s. Due to the acceleration of the first drive 12, which is in the present embodiment greater than 10,000 mm/s$^2$, typically greater than 15,000 mm/s$^2$, particularly typically greater than 18,000 mm/s$^2$ and further typically less than 30,000 mm/s$^2$, typically less than 25,000 mm/s$^2$, particularly typically smaller than 22,000 mm/s$^2$ and more specifically 20,000 mm/s$^2$, the time until the light carrier 11 has reached the predetermined velocity is negligibly small and does not adversely affect the acquisition of the stripe recording 19. Therefore, as soon as the light carrier 11 is moved in the first direction 9, the acquisition of the stripe recording 19 by the camera 4 can be started. The recording of the stripe recording 19 ends when the linear adjustment of the light carrier 11 has ended. Therefore, as soon as the light carrier 11 is moved in the first direction 9, the acquisition of the stripe recording 19 by the camera 4 can be started. The acquisition of the stripe recording 19 ends when the linear adjustment of the light carrier 11 has ended. With a typical stripe length of about 168 mm, typical acquisition durations of the image acquisition device 3 are in the range of about 5/100 s to 6/100 s. A collimator lens 14 is arranged between the illumination device 2 and the handling system 5. The camera 4 also has a telecentric lens 15 and is connected to a control device 16 which enables image acquisition adapted to the linear displacement of the light carrier 11 in the first direction 9 and/or the second direction 10 and which prescribes the start of the image acquisition and its duration. The control device 16 also controls the first drive 12 and the second drive 13. In addition, the control device 16 comprises a memory 17 in which the individual stripe recordings 19 can be stored, and an evaluation device 18 with which the captured stripe recordings 19 are evaluated. To provide enough stability, the testing device 1 is mounted on a stand 20.

FIGS. 2A to 2E show a schematic view of the light carrier 11 according to a first exemplary embodiment which is ultimately also used in the testing device 1 shown in FIG. 1. Only the number of light sources 8 arranged on the light carrier 11 is reduced in FIG. 2 compared to FIG. 1 for reasons of clarity. In FIGS. 2A to 2E the light carrier 11 is shown in each figure on the upper part of the figures, and the lower part of the drawings shows in each figure a section of a stripe recording 19 taken by the camera 4, which is achieved by the linear displacement of the light carrier 11 along the first direction 9 and the adjusted acquisition duration of the camera 4. The stripe recording 19 has alternating light stripes 19.1 and dark stripes 19.2. As indicated by the arrow and as the comparison of the individual FIGS. 2A to 2E shows, the position of the light carrier 11 is adjusted between the individual stripe recordings 19 in the second direction 10 by the second drive 13. After the position of the light carrier 11 has been adjusted in the second direction 10, the next stripe recording 19 can be captured by linearly adjusting the light carrier 11 in the first direction 9 and simultaneously capture a further stripe recording 19 by the camera 4. A comparison of the FIGS. 2A to 2E further reveals that the position of the light stripes 19.1 is then shifted relative to the previously recorded stripe recording 19.

In the second exemplary embodiment of the light carrier 11 shown in the upper half of each of FIGS. 3A to 3E, the number of light sources 8, which are formed by LEDs, is significantly increased and the distance D between the individual light sources 8 is shorter compared to the first exemplary embodiment of the light carrier 11 shown in FIGS. 2A to 2E. However, only some of the light sources 8.1 are activated in each case during the creation of the stripe recordings 19, while the remaining light sources 8.2 remain deactivated during the corresponding image. This is indicated in FIGS. 3A to 3E by the rays at the activated light sources 8.1 and by the deactivated light sources 8.2 shown in dark. After the respective stripe recording 19 has been captured, previously active light sources 8.1 are deactivated again and the neighboring light sources 8.1 are activated, whereby the light strips 19.1— similar to the first exemplary embodiment—wander in the second direction 10, but without having to provide the second drive 13.

Figure 4:
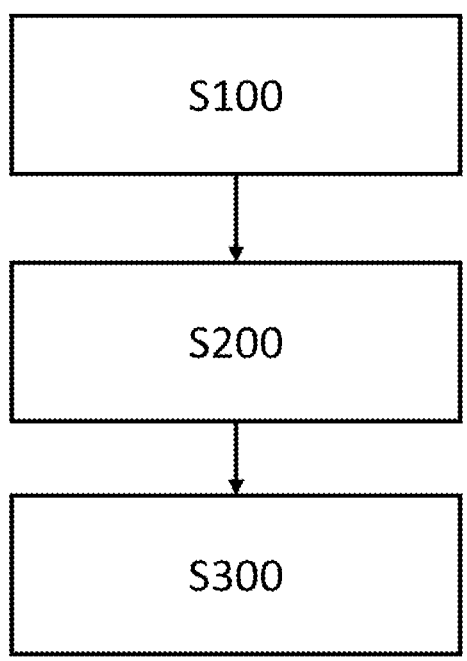
FIG. 4 show a flow chart of a testing method according to the disclosure.

FIG. 4 shows a flow chart of the testing method according to the disclosure for detecting a defect of a transparent test specimen 5, in particular of an ophthalmic lens. The method comprises an image acquisition step S100, in which a plurality of stripe recordings 19 are captured by an image acquisition device 3, which are generated with the aid of an illumination device 2. In present embodiment, the illumination device 2 for generating a stripe pattern 7, as already explained in detail with reference to FIG. 1 and FIGS. 2A to 2E, comprises a plurality of light sources 8 which are linearly displaced in a first direction 9 by means of a first drive 12 in the image acquisition step S100. At the same time, in order to capture the stripe pattern 7, the acquisition duration of the image acquisition device 3 is set such that the light emitted from each of the linearly adjusted light sources 8 is captured as a light stripe 19.1 in each case. Between the individual stripe recordings 19, the illumination device 2 is, in a preferred embodiment, linearly adjusted by means of a second drive 13 in a second direction 10 which is substantially perpendicular to the first direction 9. Furthermore, the method according to the disclosure comprises a reconstruction step S200 in which an overall image is reconstructed from the stripe recordings 19, and a defect detection step S300 in which a defect is detected from the overall image. The detected defects are the further characterized especially by their nature and by their position with respect to a coordinate system, which might be defined by permanent engravings or other markings on the test specimen 5.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 1 testing device
2 illumination device
3 image acquisition device
4 camera
5 test specimen
6 observation path
7 stripe pattern
8 light source
8.1. activated light source
8.2. deactivated light source
9 first direction
10 second direction
11 light carrier
12 first drive
13 second drive
14 collimator lens
15 telecentric lens
16 control device
17 memory
18 evaluation device
19 stripe recording
19.1 light stripe
19.2 dark stripe
20 stand
D distance
S100 image acquisition step
S200 reconstruction step
S300 defect detection step

The invention claimed is:

1. A testing device for detecting defects of transparent test specimens, including an ophthalmological lens, the testing device comprising:
an illumination device for transilluminating a test specimen to be examined; and
an image acquisition device for imaging the test specimen transilluminated by the illumination device, wherein the illumination device includes a plurality of light sources, which are linearly moveable by a first drive in a first direction for generating a stripe pattern, and wherein, in order to capture the stripe pattern, an acquisition duration of the image acquisition device can be adjusted in such a way that the light emitted by each of the light sources, moved linearly by the first drive in the first directions, is detected as a light stripe.

2. The testing device according to claim 1, wherein a second drive is provided for repositioning of the light sources between individual stripe recordings in a second direction substantially perpendicular to the first direction.

3. The testing device according to claim 2 wherein the first direction and the second direction are in each case substantially perpendicular to an observation path of the image acquisition device.

4. The testing device according to claim 1, wherein the light sources are arranged on a light carrier.

5. The testing device according to claim 1, wherein the light sources are arranged at an equidistant distance from one another.

6. The testing device according to claim 5, wherein the distance between adjacent light sources is greater than 3 mm, or is greater than 5 mm; and/or
is less than 12 mm, or is less than 10 mm;
or is 7 mm.

7. The testing device according to claim 1, wherein the number of light sources is greater than 1, or is greater than 8, or is greater than 12; and/or
is less than 50, or is less than 30;
or is 23.

8. The testing device according to claim 1, wherein a velocity of the first drive for moving the light sources in the first direction and/or the velocity of the second drive for moving the light sources in the second direction is greater than 1,000 mm/s, or is greater than 2,000 mm/s, or is greater than 2,500 mm/s; and/or
is less than 5,000 mm/s, or is less than 4,000 mm/s, or is less than 3,500 mm/s; or
is 3,000 mm/s.

9. The testing device according to claim 1, wherein an acceleration of the first drive and/or the acceleration of the second drive is greater than 10,000 mm/s$^2$, or is greater than 15,000 mm/s$^2$, or is greater than 18,000 mm/s$^2$; and/or
is less than 30,000 mm/s$^2$, or is less than 25,000 mm/s$^2$, or is less than 22,000 mm/s$^2$; or
is 20,000 mm/s$^2$.

10. The testing device according to claim 1, wherein the image acquisition device comprises a camera with a telecentric lens.

11. A testing device for detecting defects of transparent test specimens, including an ophthalmological lens, the testing device comprising:
an illumination device for transilluminating a test specimen to be examined; and
an image acquisition device for imaging the test specimen transilluminated by the illumination device, wherein the illumination device includes a plurality of light sources, which are arranged on a light carrier that is linearly moveable in a first direction for generating a stripe pattern, and wherein, in order to capture the stripe pattern, an acquisition duration of the image acquisition device can be adjusted in such a way that the light emitted by each of the light sources arranged on the light carrier and moved linearly in the first direction is detected as a light stripe.

12. The testing device according to claim 11, wherein a first drive is provided for linear movement of the light sources in the first direction.

13. A testing device for detecting defects of transparent test specimens, including an ophthalmological lens, the testing device comprising:
an illumination device for transilluminating a test specimen to be examined; and
an image acquisition device for imaging the test specimen transilluminated by the illumination device, wherein the illumination device includes a plurality of point light sources, which are designed as LEDs and which are linearly moveable in a first direction for generating a stripe pattern, and wherein, in order to capture the stripe pattern, an acquisition duration of the image acquisition device can be adjusted in such a way that the light emitted by each of the light sources moved linearly in the first direction is detected as a light stripe.

14. A testing method for detecting a defect of a transparent specimen, including an ophthalmological lens, the testing method comprising:
- (a) an image acquisition step in which a plurality of stripe recordings is captured by an image acquisition device and are generated with the aid of an illumination device;
- (b) a reconstruction step, in which an overall image is reconstructed from the stripe recordings; and
- (c) a defect detection step in which a possible defect is detected from the overall image;
- wherein the illumination device for generating a stripe pattern includes a plurality of light sources which are linearly moved in a first direction by a first drive in the image acquisition step, and wherein, in order to capture the stripe pattern the acquisition duration of the image acquisition device is set in such a way that the light emitted by the linearly moved light sources is respectively detected as a light stripe.

15. The testing method according to claim 14, wherein in the image acquisition step for displacing the stripe pattern between the individual stripe recordings, the light sources are displaced in a second direction oriented substantially perpendicular to the first direction.

16. The testing method according to claim 14, wherein, in the image acquisition step, different light sources are used in each case for generating the stripe pattern in the individual stripe recordings.

17. The testing method according to claim 14, wherein the defect detection step captures the position of the identified defects.

18. A testing method for detecting a defect of a transparent specimen, including an ophthalmological lens, the testing method comprising:
- (a) an image acquisition step in which a plurality of stripe recordings is captured by an image acquisition device and is generated with the aid of an illumination device;
- (b) a reconstruction step in which an overall image is reconstructed from the stripe recordings; and
- (c) a defect detection step in which a possible defect is detected from the overall image;
- wherein the illumination device for generating a stripe pattern includes a plurality of light sources, arranged on a light carrier, which are linearly moved in a first direction in the image acquisition step, and wherein, in order to capture the stripe pattern an acquisition duration of the image acquisition device is set in such a way that the light emitted by the linearly moved light sources is respectively detected as a light stripe.

19. A testing method for detecting a defect of a transparent specimen, including an ophthalmological lens, the method comprising:
- (a) an image acquisition step in which a plurality of stripe recordings is captured by an image acquisition device and are generated with the aid of an illumination device;
- (b) a reconstruction step, in which an overall image is reconstructed from the stripe recordings; and
- (c) a defect detection step in which a possible defect is detected from the overall image;
- wherein the illumination device for generating a stripe pattern includes a plurality of point light sources, which are designed as LEDs and which are linearly moved in a first direction in the image acquisition step, and wherein, in order to capture the stripe pattern the acquisition duration of the image acquisition device is set in such a way that the light emitted by the linearly moved light sources is respectively detected as a light stripe.

* * * * *